United States Patent
Weininger et al.

(10) Patent No.: US 8,601,019 B1
(45) Date of Patent: Dec. 3, 2013

(54) PRESENTING AUTOCOMPLETE SUGGESTIONS

(75) Inventors: Nicholas B. Weininger, San Francisco, CA (US); Radu C. Cornea, Sunnyvale, CA (US); Yosi Markovich, Haifa (IL); Dmitry Zinenko, Beer Sheva (IL); Nicholas G. Fey, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/438,097

(22) Filed: Apr. 3, 2012

(51) Int. Cl.
*G06F 17/30* (2006.01)

(52) U.S. Cl.
USPC .......................................................... 707/769

(58) Field of Classification Search
USPC ............................ 707/2, 3, 771, 769; 709/219
See application file for complete search history.

(56) References Cited

U.S. PATENT DOCUMENTS

| | | | |
|---|---|---|---|
| 7,634,463 B1 | 12/2009 | Katragadda et al. | |
| 7,685,144 B1 | 3/2010 | Katragadda | |
| 7,788,248 B2 | 8/2010 | Forstall et al. | |
| 7,890,961 B2 | 2/2011 | Whittle et al. | |
| 8,332,748 B1 | 12/2012 | Karam | |
| 8,386,926 B1 | 2/2013 | Matsuoka | |
| 2003/0041147 A1 | 2/2003 | van den Oord et al. | |
| 2006/0075120 A1 | 4/2006 | Smit | |
| 2006/0242109 A1 | 10/2006 | Pereira et al. | |
| 2007/0061317 A1 | 3/2007 | Ramer et al. | |
| 2010/0318538 A1 | 12/2010 | Wyman et al. | |
| 2011/0106966 A1 | 5/2011 | Smit | |
| 2012/0084075 A1 | 4/2012 | Yamada et al. | |
| 2012/0265784 A1* | 10/2012 | Hsu et al. | 707/771 |
| 2012/0297294 A1 | 11/2012 | Scott et al. | |

* cited by examiner

*Primary Examiner* — Etienne Leroux
(74) *Attorney, Agent, or Firm* — Fish & Richardson P.C.

(57) ABSTRACT

Methods, systems, and apparatus, including computer programs encoded on a computer storage medium, for presenting autocomplete suggestions. A computing device can receive a query and autocomplete suggestions for the query. The autocomplete suggestions can be displayed in a plurality of separately selectable cells arranged in a column on a user interface. While a selected cell is displayed at a first location, input indicating that a user interacted with the selected cell can be received. In response to receiving the input, the computing device can display the selected cell at a second location that is different from the first location, include the autocomplete suggestion displayed in the selected cell in the query, and display autocomplete suggestions for the extended query in a plurality of separately selectable second cells.

30 Claims, 6 Drawing Sheets

PRESENTING AUTOCOMPLETE SUGGESTIONS

BACKGROUND

This specification generally relates to processing and presenting autocomplete suggestions.

Entering user input using computing devices is a common activity, and text is a common form of user input. Entering text and other input to computing devices can be time consuming. In addition, erroneous keystrokes on a physical or virtual keyboard may need to be corrected, further complicating the entry of input.

SUMMARY

A computing device can receive autocomplete suggestions for a query, and can display the autocomplete suggestions in multiple cells that are arranged in a column on a user interface. As a user selects cells to add autocomplete suggestions to the query, different autocomplete suggestions can be presented in columns on the user interface. For example, after receiving input indicating that a user interacted with a selected cell, the computing device can display the selected cell at a different location. The autocomplete suggestion displayed in the selected cell can be included in the query to generate an extended query, and autocomplete suggestions for the extended query can be displayed in separately selectable second cells. The second cells can be displayed in a column adjacent to the selected cell. As the user interacts with additional cells, additional columns of selectable cells can be displayed, allowing the user to further extend the query.

One innovative aspect of the subject matter described in this specification is embodied in methods that include the actions of: receiving a query including an n-gram of characters; receiving autocomplete suggestions for the query; displaying the received autocomplete suggestions in a plurality of separately selectable first cells, the first cells being arranged in a column on a user interface; receiving input indicating that a user interacted with a selected cell of the displayed first cells, the interaction occurring while the selected cell is displayed at a first location on the user interface; and in response to receiving the input indicating that the user interacted with the selected cell: displaying the selected cell at a second location on the user interface, the second location being different from the first location, including the autocomplete suggestion displayed in the selected cell in the query to generate an extended query, and displaying autocomplete suggestions for the extended query in a plurality of separately selectable second cells, the second cells being arranged in a column on the user interface, the column of the second cells being located adjacent to the selected cell when the selected cell is at the second location.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, in response to receiving the input indicating that the user interacted with the selected cell, not displaying the first cells other than the selected cell on the user interface. Displaying the autocomplete suggestions for the extended query in the plurality of separately selectable second cells includes displaying the column of the second cells where the column of the first cells was located when the user interacted with the selected cell. Displaying the selected cell at a second location on the user interface includes displaying the selected cell at a location to the left or to the right of the first location. Receiving the input indicating that the user interacted with the selected cell of the displayed first cells includes receiving input indicating that a user interacted with a list control associated with the selected cell, and displaying autocomplete suggestions for the extended query in the plurality of separately selectable second cells includes displaying autocomplete suggestions associated with the list control in the second cells. Receiving input indicating a second interaction of the user with the list control, and in response to receiving the input indicating the second interaction of the user with the list control: not displaying the second cells on the user interface, and displaying the first cells in a column on the user interface.

Receiving input indicating that the user interacted with a second selected cell of the second cells, and in response to receiving the input indicating that the user interacted with the second selected cell: displaying the selected cell at the second location on the user interface, including the autocomplete suggestion displayed in the second selected cell in the extended query to generate a second extended query, and displaying autocomplete suggestions for the second extended query in a plurality of separately selectable third cells, the third cells being arranged in a column on the user interface, the column of the third cells being located adjacent to the second selected cell when the second selected cell is at the second location. In response to receiving the input indicating that the user interacted with the second selected cell: including the autocomplete suggestion displayed in the selected cell in a text field in the user interface, and not displaying the selected cell on the user interface.

Transmitting the query to a server system prior to receipt of query completion data, where receiving the autocomplete suggestions for the query includes receiving the autocomplete suggestions for the query from the server system. Receiving the autocomplete suggestions for the query includes receiving one or more autocomplete suggestions that are each a proper subset of words in a prior query. Including the selected autocomplete suggestion in the query to generate an extended query includes replacing a portion of the query with the selected autocomplete suggestion. Including the selected autocomplete suggestion in the query to generate an extended query includes appending the selected autocomplete suggestion to the query. Receiving the autocomplete suggestions for the query includes receiving one or more autocomplete suggestions that are multigrams.

Advantageous implementations can include one or more of the following features. Autocomplete suggestions can be presented on a user interface. Queries can be composed word-by-word or phrase-by-phrase using the autocomplete suggestions. The autocomplete suggestions can be words or phrases that are partial completions for a query. The autocomplete suggestions can be partial queries or a proper subset of one or more prior queries. A computing device can assist a user to generate a query in stages. User interface elements can be provided to indicate whether the user has finished composing a query, thereby enabling a user to be provided and/or select multiple different sets of query suggestions prior to user indication that the query is complete. Multiple autocomplete suggestions can be presented in a grid or in columns.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
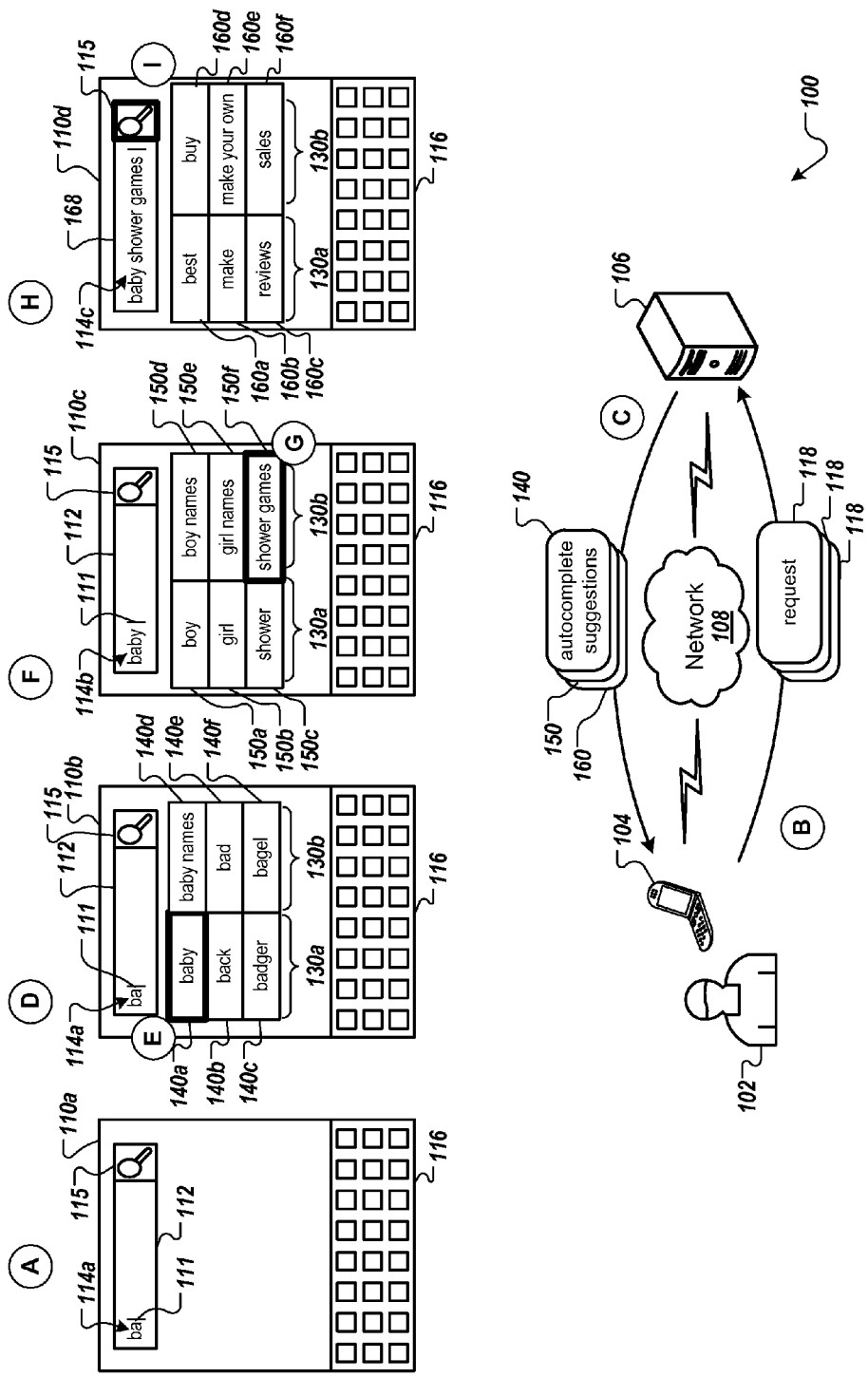
FIG. 1 is a diagram that illustrates an example of an environment in which autocomplete suggestions are presented.

FIG. 1 is a diagram that illustrates an example of an environment 100 in which autocomplete suggestions are provided. The environment 100 includes a computing device 104 and a server system 106 that communicate over a network 108. The diagram shows states (A) to (I), which may occur in the sequence illustrated or in a different sequence. States (B) and (C) illustrate a flow of data, and states (A) and (D) to (I) illustrate user interfaces 110a-110d and interactions with the user interfaces 110a-110d.

The computing device 104 can be, for example, a desktop computer, a laptop computer, a cellular phone, a smartphone, a personal digital assistant (PDA), a tablet computer, a navigation system, or another computing device. The operations performed by the server system 106 can be performed by individual computer systems or can be distributed across multiple computer systems. The network 108 can be wired or wireless or a combination of both. The network 108 can include one or more public or private networks, and can include the Internet.

The computing device 104 facilitates entry of user input by providing suggested inputs to a user 102. For example, when the user 102 enters one or more characters, the computing device 104 can provide autocomplete suggestions that are selected using the entered one or more characters. The autocomplete suggestions that are provided can include words or phrases that include the one or more characters that were entered by the user 102. For example, complete words or extended phrases can be suggested for partial words or partial phrases that a user has entered (e.g., using a physical or virtual keyboard). The autocomplete suggestions can also include words or phrases that are similar to (e.g., synonyms of or spelling corrections of) the user input. The user 102 can interact with (e.g., tap, click, or otherwise affirmatively select) one of the provided autocomplete suggestions to enter the suggested text.

The computing device 104 can permit multiple autocomplete suggestions to be included in a same search query (e.g., prior to a user indication that the search query is complete). For example, a user interface of the computing device 104 can allow a user to select multiple autocomplete suggestions in succession, allowing the user to build a search query one word or one phrase at a time. A phrase can include one or more words. When the user selects multiple autocomplete suggestions, the query can include each of the selected autocomplete selections in the sequence that they were selected. After each selection of an autocomplete suggestion, the computing device 104 configures the user interface to receive additional query content rather than ending the query building process in response to user selection of an autocomplete suggestion.

As an example, when a user selects an autocomplete suggestion, the selected autocomplete suggestion is added to the query, forming an extended query. The computing device 104 then presents new autocomplete suggestions for the extended query. By selecting one of the new autocomplete suggestions, the user can add it to the query, and can continue to add additional autocomplete suggestions (or other input) until the user indicates that the query is complete.

In some implementations, the computing device 104 does not initiate a search using the query in response to a selection of an autocomplete suggestion. Rather, the computing device 104 can wait to initiate a search until query completion data is received. The query completion data can indicate that the user has finished composing a complete query. The query completion data can be received as an interaction with a user interface element that occurs separate from the selection of an autocomplete suggestion.

Because the computing device 104 permits queries to be composed in stages (e.g., through multiple user selections of autocomplete suggestions), the autocomplete suggestions can be components of queries or query fragments rather than complete queries. For example, each autocomplete suggestion can be a likely next word or next phrase of a query being composed, rather than a suggestion of a complete query. As a result, typical autocomplete suggestions may be shorter than many complete queries, and the number of autocomplete suggestions that fit in a display area can be greater than the number of complete queries that would fit in the display area. This allows autocomplete suggestions to be displayed in an efficient manner, for example, permitting autocomplete suggestions to be displayed side by side where multiple complete queries would exceed display constraints. For example, autocomplete suggestions can be displayed in two or more columns.

In addition, because the number of autocomplete suggestions that can be simultaneously displayed may exceed the number of complete queries that can be displayed, the user is more likely to be presented a word or phrase that will be selected by the user. When the user changes the query (e.g., through keyboard input or selection of an autocomplete suggestion), the autocomplete suggestions are refreshed, exposing the user to many different combinations of query terms during the query building process. The number of query term combinations that can be constructed using these partial autocomplete suggestions can exceed the combinations of terms present in a limited set of complete queries.

As an example of these techniques, in some implementations, autocomplete suggestions for a query are displayed in multiple columns on a user interface. User input can be received that indicates that a user selected one of the displayed autocomplete suggestions. In response to receiving input indicating that the user selected one of the displayed autocomplete suggestions, the selected autocomplete suggestion can be included in the query to generate an extended query. The user interface can be configured to permit additions to the extended query. The including of the autocomplete suggestion in the query and the configuring of the user interface to permit additions to the extended query can occur prior to receipt of query completion data. The query completion data can be data (e.g., an indication of a selection of an enter key or a search control) which indicates that the user has composed a complete query.

As another example of these techniques, in some implementations, autocomplete suggestions are displayed in a plurality of separately selectable first cells, with the first cells being arranged in a column on a user interface. User input indicating that a user interacted with a selected cell of the displayed first cells can be received, and the user interaction can occur while the selected cell is displayed at a first location on the user interface. In response to receiving the user input, the selected cell can be displayed at a different, second location on the user interface, the autocomplete suggestion displayed in the selected cell can be included in the query to generate an extended query, and autocomplete suggestions for the extended query can be displayed in a plurality of separately selectable second cells. The second cells can be arranged in a column on the user interface, the column being located adjacent to the selected cell when the selected cell is at the second location.

For purposes of example, assume that in states (A) to (I) a user 102 composes a query in multiple stages, and then initiates a search using the query by indicating that the user has completed the query. To aid the user 102 in building the query, the computing device 104 presents a progression of user interfaces 110a-110d. The user interfaces 110a-110d represent different stages during the composition of the query, and illustrate multiple autocomplete suggestions that are added to the query. As described below, the user first enters an initial query 114a, then adds the text of an autocomplete suggestion to form an extended query 114b, and then adds the text of an additional autocomplete suggestion to form another extended query 114c. When satisfied that the extended query 114c is complete, the user 102 initiates a search using the extended query 114c, for example, by interacting with a search initiation control 115.

In further detail, in state (A), the user 102 enters the query 114a at the computing device 104. The query 114a includes an n-gram of characters. The n-gram may include, for example, at least one character. The n-gram may form one or more words or be a partial word.

In the illustrated example, the user interface 110a of the computing device 104 includes an input field 112 (e.g., a text field or text entry box) and the search initiation control 115. The user interface 110a may be a user interface for, for example, a web browser, a rendered web page, a search application, an e-mail application, a text-messaging application (e.g., a short message service (SMS) application), or any other application that accepts input. The input field 112 can be, for example, a search query field or another entry field or editable area, such as any user interface element that is used for text input. The user 102 can interact with the search initiation control 115 to initiate a search using the text in the input field 112. Note that user interaction with the search initiation control 115 is an indication that the user has completed building the search query.

As illustrated by FIG. 1, in state (A), the user 102 enters the query 114a, "ba", into the input field 112. The user 102 can enter the query 114a using, for example, a physical keyboard, a virtual keyboard 116 displayed in the user interface 110a, or a different user interface. In the input field 112, a text cursor 111 indicates a location where subsequently entered text will be located.

In state (B), the computing device 104 requests autocomplete suggestions for the query 114a. The computing device 104 sends a request 118 to the server system 106 over the network 108. The request 118 includes, identifies, or otherwise indicates the content of the query 114a.

In state (C), the server system 106 identifies one or more autocomplete suggestions 140 for the query 114a and sends the identified autocomplete suggestions 140 to the computing device 104. The server system 106 can select the autocomplete suggestions to include, for example, words or phrases that include the text of the query 114a, are synonyms of the query 114a, or frequently occur after the text of the query 114a.

In some implementations, the autocomplete suggestions 140 are selected from queries submitted by the user 101 and/or multiple other users. The server system 106 can obtain a set of prior queries submitted by the one or more users and identify occurrences of the text of the query 114a in the prior queries. The server system 106 identifies words or phrases in the prior queries that include the text of the query 114a and counts the occurrences of each identified word and phrase. The server system 106 also identifies words or phrases that occur after the text of the query 114a (e.g., immediately following the text of the query 114a as the next word or phrase), and counts occurrences of the words or phrases that follow the text of the query 114a. From the identified words and phrases, the server system 106 selects the words or phrases with the N-highest counts, where N is an integer (e.g., four, eight, or ten).

The selected words or phrases, or portions thereof (e.g., a proper subset of the words or phrases that extends a last term of the query 114a), can be used as autocomplete suggestions for the query 114a. In this manner, each autocomplete suggestion can be one of the words or phrases that most commonly completes a term of the query 114a or follows the text of the query 114a in the prior queries.

The autocomplete suggestions can be portions of the prior queries (e.g., query fragments or partial completions) rather than the entire prior queries. For example, one or more autocomplete suggestions can be a proper subset of words in a prior query. As another example, one or more autocomplete suggestions can be a proper subset of words in a portion of a prior query that occurs after the content of the query 114a (e.g., a proper subset of words in a portion that excludes the content of the query 114a).

In state (D), the computing device 104 receives and displays the autocomplete suggestions 140 for the query 114a on the user interface 110b. For example, the computing device 104 receives data that identifies the set of autocomplete suggestions 140, and uses this data to display the set of autocomplete suggestions 140. The computing device 104 can additionally receive information that indicates an order or ranking of the autocomplete suggestions 140.

The computing device 104 displays the autocomplete suggestions 140 side by side, for example, in multiple columns 130a, 130b. Within the columns 130a, 130b, each of the autocomplete suggestions 140 is displayed in a different cell 140a-140f, for example, in a different region or target area defined by a grid or table. The user 102 can interact with (e.g., tap, click, hover over, or otherwise select) any of the cells 140a-140f to select the corresponding autocomplete suggestion 119 displayed within.

The columns 130a, 130b can be displayed below the input field 122, or at another position relative to the input field 122. The columns 130a, 130b can be displayed at a predetermined distance from the input field 122. The predetermined distance can be a distance within, for example, a predetermined number of pixels from the input field 122.

The computing device 104 can determine the number of columns to display based on, for example, a size of a screen or display area in which the user interface 110a is displayed, a number of autocomplete suggestions received from the server system 106, and/or a number of characters included in one or more of the autocomplete suggestions. For example, when the computing device 104 determines that a display area is less than a threshold width, two columns of separately selectable cells containing autocomplete suggestions can be displayed.

By contrast, three columns of separately selectable cells can be displayed when the width is determined to meet or exceed the threshold width. Each of the separately selectable cells can have at least a minimum width and height, for example, such that the cell size is large enough to be selected using a finger when displayed on a touchscreen interface.

In state (E), the user 102 interacts with one of the cells 140a-140f to select one of the autocomplete suggestions 140. In the illustrated example, the user 102 selects the cell 140a which contains the autocomplete suggestion "baby", as indicated by the bolded box in which the term "baby" is presented. The computing device 104 detects the interaction of the user 102 with the cell 140a, and in response, causes the autocomplete suggestion 119 displayed in the cell 140a to be included in the query 114a. For example, the computing device 104 replaces the partial word "ba" of the query 114a with the autocomplete suggestion "baby" to form the extended query 114b. In general, selection of an autocomplete suggestion by selecting one of the cells 140a-140f can permit text entry that is faster and less error-prone than other forms of input, such as entering text using the virtual keyboard 116 because the user is not required to enter each character using the keyboard.

After the computing device 104 forms the extended query 114b, the computing device 104 permits the user 102 to make further additions to the extended query 114b. For example, the computing device 104 can facilitate additions to the query 114b by providing additional autocomplete suggestions that can be added to the extended query 114b. Operations similar to those described with reference to states (B) and (C) can be repeated, so that new autocomplete suggestions 150—selected using the extended query 114b—are received. The computing device 104 sends a request 118 that identifies the extended query 114b. The server system 106 identifies and sends autocomplete suggestions 150 for the extended query 114b to the computing device 104.

In some implementations, the computing device 104 does not initiate a search in response to the selection of the autocomplete suggestion 140 in the cell 140a. Rather, the computing device 104 can initiate a search after query completion data is received through an interaction separate from selection of an autocomplete suggestion. For example, user interaction with a target area other than the cells 140a-140f (e.g., interaction with the search initiation control 115) can be required to generate the query completion data that initiates a search.

In state (F), the computing device 104 displays the updated user interface 110c, which, for example, shows the extended query 114b in the input field 112. By contrast with systems that terminate a query entry process when an autocomplete suggestion is selected, the computing device 104 configures the user interface 110c to permit additions to the extended query 114b. Further query additions can be made through selection of the autocomplete suggestions 150 for the extended query 114b, or through typing or other input methods.

Using one or more of the following techniques, the user interface 110c can be configured to receive additions to the query 114b. The computing device 104 configures the user interface 110c to permit query additions by, for example, placing the text cursor 111 in the input field 112. The computing device 104 can place the text cursor 111 at a position after extended query 114b. For example, the text cursor 111 can be placed adjacent to, or spaced apart from (e.g., one space character after), the end of the extended query 114b. The input field 112 can retain or be given focus on the user interface 110c such that subsequent text entry is directed to the input field 112. In some implementations, the computing device 104 does not select or highlight the contents of the input field 112 in a manner that would cause the extended query 114b to be overwritten by subsequent input for the query. The computing device 104 can also eliminate such selection or highlighting if present. In this manner, the computing device 104 can configure the user interface 110c, independent of user interaction, to accept from the user further additions to the extended query 114b.

The computing device 104 can also configure the user interface 110c to permit additions by displaying the autocomplete suggestions 150 for the extended query 114b. The autocomplete suggestions 150 for the extended query 114b are displayed in separately selectable cells 150a-150f, arranged in the columns 130a, 130b. The number of rows and columns can be the same as the number of rows and columns in which the autocomplete suggestions 140 were displayed. As an alternative, the number of rows and columns of the user interface 110c can be different than the number in the user interface 110b.

In some implementations, complete words that are included in the extended query 114b are not repeated in the autocomplete suggestions 150, or are omitted from display in the selectable cells 150a-150f. For example, the word "baby" (which is included in the input field 112) is not repeated in the selectable cells 150a-150f. The input field 112 displays the text of the extended query 114b, indicating the text to which one of the autocomplete suggestions 150 would be appended if selected.

In state (G), the user 102 interacts with the cell 150f to select the corresponding autocomplete suggestion 150, "shower games." In response, the computing device 104 includes the selected autocomplete suggestion 150 in the extended query 114b to form an extended query 114c. In the same manner described for state (E), the computing device 104 configures the user interface to permit additions to the extended query 114c. Operations similar to those described with reference to states (B) and (C) are again repeated. For example, the computing device 104 sends a request 118 that identifies the extended query 114c, and the server system 106 provides autocomplete suggestions 160.

In state (H), the computing device 104 presents the user interface 110d, which is configured to permit further additions to the extended query 114c. The received autocomplete suggestions 160 are displayed in separately selectable cells 160a-160f. The user 102 can continue to select autocomplete suggestions 160 to build the query one portion at a time, for example, word by word or phrase by phrase.

In state (I), the computing device 104 receives query completion data that indicates that a search should be initiated using the extended query 114c. In the illustrated example, the user 102 interacts with the search initiation control 115 to indicate that the extended query 114c is complete. This interaction is separate from the interaction of the user 102 with the selectable cells 160a-160f that add autocomplete suggestions to the extended query 114c.

In general, query completion data can be received through interaction with a user interface element different from the selectable cells 160a-160f, for example, through interaction with a screen area or target that is distinct from the cells 160a-160f. The user 102 can indicate that a query is complete through other interactions, including for example, a period of inactivity, a gesture, voice input, movement of the computing device 104, or other interactions with the computing device 104.

In response to selection of the search initiation control 115, the computing device 104 sends the extended query 114c, "baby shower games", to the server system 106 or to a search engine of another server system. The server system 106 or another search engine system can, for example, identify and provide search results that are responsive to the extended query 114c.

In some implementations, autocomplete suggestions are identified by the computing device 104 in addition to or instead of by the server system 106. For example, the computing device 104 can identify autocomplete suggestions in a local cache that is included in the computing device 104. Autocomplete suggestions from the local cache can be used instead of requesting autocomplete suggestions in states (B) and (C), or can be merged with autocomplete suggestions 140 received from the server system 106.

In some implementations, autocomplete suggestions can be displayed on the user interface 110a, even before the user 102 enters any characters to begin the query. For example, the computing device 104 can provide autocomplete suggestions in selectable cells when the user 102 interacts with a user interface element for entering a search query, for example, by clicking, tapping, or otherwise interacting with the input field 112 that receives a search query. The autocomplete suggestions can be, for example, popular initial words or phrases of queries from other users, or initial words or phrases from queries previously submitted by the user 102.

In some implementations, the computing device 104 can initiate a search each time a query is modified, before receiving query completion data, and also configure the user interface to receive additions to the query. Independent of indications from the user 102 that the query is complete, an automatic or instant search can be performed using the user's query or one or more autocomplete suggestions. A first portion of a user interface can display search results and a second portion of the user interface can display selectable cells that contain different autocomplete suggestions. For example, search results for the extended query 114b can be presented on the user interface 110c, and search results for the extended query 114c can be presented on the user interface 110d. In these implementations, the computing device 104 can still enable a user to continue to iteratively build a search query in the manner described above (e.g., until the user performs an action indicating that the search query is complete).

In addition to, or instead of, the multiple columns 130a, 130b of selectable cells illustrated in the user interfaces 110b, 110c, 110d, the computing device 104 can present autocomplete suggestions and other user interface elements as shown in FIGS. 2A to 2E.

Figure 2A:
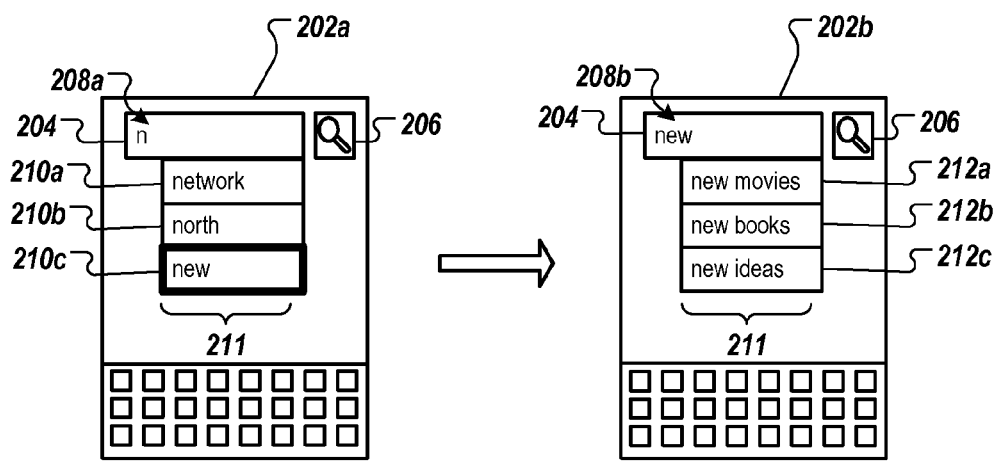
FIGS. 2A to 2E illustrate examples of user interfaces that present autocomplete suggestions.

FIG. 2A illustrates examples of user interfaces 202a, 202b that present autocomplete suggestions. The user interface 202a includes an input field 204, in which a user's query 208a is shown. A search initiation control 206 is also located in the user interface 202a. Autocomplete suggestions for the query 208a are presented in separately selectable cells 210a-210c, arranged in a single vertical column 211. A greater number of columns can optionally be used, as described above. Each cell 210a-210c is a separate target area that a user can interact with, for example, by touching a corresponding location on a touchscreen or using a pointing device. Interaction with one of the cells 210a-210c is detected by a computing device (such as the computing device 104 of FIG. 1), and is included in the query 208a to form an extended query 208b.

In the illustrated example, a user interacts with the cell 210c, which contains the text "new". In response to the interaction, the computing device displays the user interface 202b, which shows the extended query 208b (e.g., "new") in place of the query 208a (e.g., "n") in the input field 204.

The user interface 202b is configured to permit additions to the extended query 208b. For example, autocomplete suggestions for the extended query 208b are displayed in separately selectable cells 212a-212c. Interaction with one of the cells 212a-212c causes the autocomplete selection corresponding to the cell 212a-212c (e.g., displayed within the cell 212a-212c) to be included in the extended query 208b. If the user is satisfied that the extended query 208a is complete, the user can interact with the search initiation control 206, which causes query completion data to be received by the computing device.

By contrast with the autocomplete suggestions displayed in the cells 150a-150f, 160a-160f of FIG. 1, the autocomplete suggestions in the cells 212a-212c repeat terms of the user's query rather than omitting them. For example, the word "new" is included in the cells 212a-212c, even though the user has already made it part of the extended query 208b. Portions of the query (e.g., one or more words of the extended query 208b) can be included in the autocomplete suggestions, providing the user context for additions to the extended query 208b.

Figure 2B:
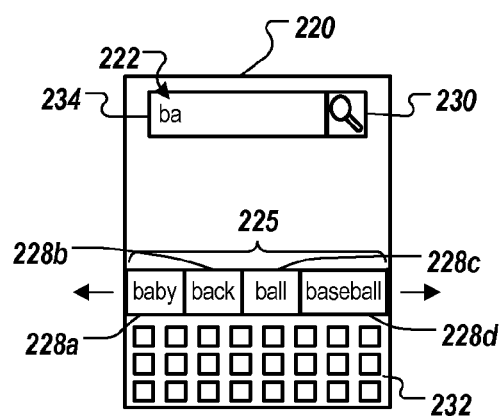

FIG. 2B illustrates an example of a user interface 220 that presents autocomplete suggestions. Autocomplete suggestions for a user's query 222 are presented in a control 225 that scrolls (e.g., from left to right and/or from right to left) to present additional autocomplete suggestions. Each autocomplete suggestion is displayed in a selectable cell 228a-228d. Interaction with one of the cells 228a-228d causes the corresponding autocomplete suggestion to be included in the query 222. In some implementations, as described above, a search is not performed until query completion data is received, for example, by interaction with a separate target area, such as a search initiation control 230. In other implementations, a search is performed in response to interactions with the cells 228a-228d, and the user interface 220 is configured to display search results and receive additions to the user's query.

In the illustrated example, the cells 228a-228d are arranged horizontally in a row. In some implementations, the cells 228a-228d can be arranged in multiple horizontal rows. The control 225 can scroll horizontally, for example, both to the right and to the left. When the user sweeps a finger horizontally along an area of a touch screen that displays the control 225, or performs a different gesture or interaction (e.g., pressing an arrow key on a keyboard), the cells 228a-228d move as a group in the corresponding direction. Some of the cells 228a-228d become hidden from view (e.g., scroll off screen), and other cells containing additional autocomplete suggestions are brought into view.

The control 225 can be located near (e.g., above and at a predefined distance relative to, or adjacent to) a virtual keyboard, as shown. The control 225 can alternatively be located near (e.g., below and at a predefined distance relative to, or adjacent to) an input field 234 for receiving the query 222.

In some implementations, vertical columns (e.g., the columns 130a, 130b) of selectable cells can also be configured to scroll vertically and/or horizontally to display additional autocomplete suggestions.

Figure 2C:
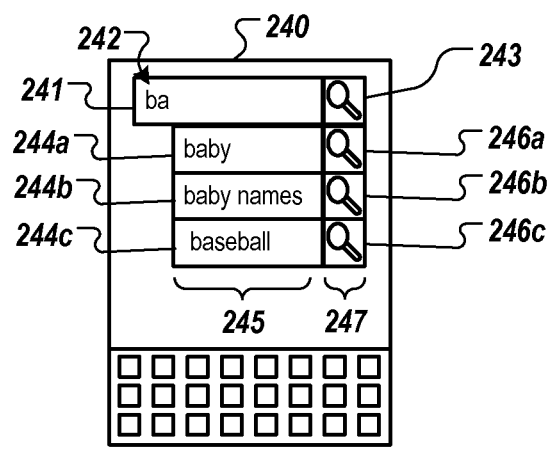

FIG. 2C illustrates an example of a user interface 240 that presents autocomplete suggestions. The user interface 240 includes an input field 241 that receives a query 242 (e.g., "ba"), and a search initiation control 243 that a user can interact with to initiate a search using the query 242. Autocomplete suggestions for the query 242 are presented in separately selectable cells 244a-244c that are arranged in a vertical column 245 beneath the input field 241. In response to user interaction with one of the cells 244a-244c, a computing device extends the query 242 to include the autocomplete selection displayed in the cell 244a-244c with which the user interacted. In some implementations, the computing device does not initiate a search in response to interaction with the cells 244a-244c.

For each cell 244a-244c (and thus for each displayed autocomplete suggestion), a corresponding search initiation control 246a-246c is displayed. For example, the search initiation controls 246a-246c can be arranged in a vertical column 247, with each search initiation control 246a-246c located to the side of the corresponding cell 244a-244c. User interaction (e.g., a tap, click, hover, or other gesture) with one of the search initiation controls 246a-246c is an indication that the user has completed the query and causes a computing device to initiate a search using the autocomplete suggestion displayed in the corresponding cell 244a-244c. For example, when a user taps on an area of a touchscreen that displays the search initiation control 246b, the computing device that provides the user interface 240 can initiate a search using "baby names" (the autocomplete suggestion in the cell 244b) as the query. Interaction with the search initiation controls 246a-246c permits the user to select autocomplete suggestions to include in the query 242 and initiate a search (e.g., through submission of query completion data) in a single action. The cells 244a-244c provide the user flexibility to add to the query 242 using one autocomplete suggestion at a time, without initiating a search.

In general, multiple target areas or controls, each linked to different functions, can be associated with a single autocomplete suggestion. In FIG. 2C, for example, each autocomplete suggestion is associated with two independently selectable target areas. Interaction with a first target area (e.g., the cell 244a) causes an autocomplete suggestion (e.g., "baby") to be included in the user's query 242, forming an extended query. The first target area can display the corresponding autocomplete suggestion or otherwise identify the corresponding autocomplete suggestion (e.g., "baby" for the cell 244a). In some implementations, interaction with the first target area does not cause a search to be performed using the extended query (e.g., does not cause query completion data to be generated). Interaction with a second target area (e.g., the search initiation control 246a) causes a search to be performed with the corresponding autocomplete suggestion (e.g., "baby" for the search initiation control 246a) in a single action. Thus interaction with the second target area can form an extended query and cause query completion data to be received by the computing device, indicating that a search should be performed using the extended query.

In some implementations, the autocomplete suggestions include (e.g., repeat) completed terms of a user's query that are already present in the input field 241. In other implementations, the autocomplete suggestions omit completed terms that are present in the input field 241, for example, showing only added terms and completions for partial words. When the autocomplete suggestions omit completed terms, interaction with a search initiation control can initiate a search using a query that includes previously entered input and new input associated with the selected search initiation control.

Figure 2D:
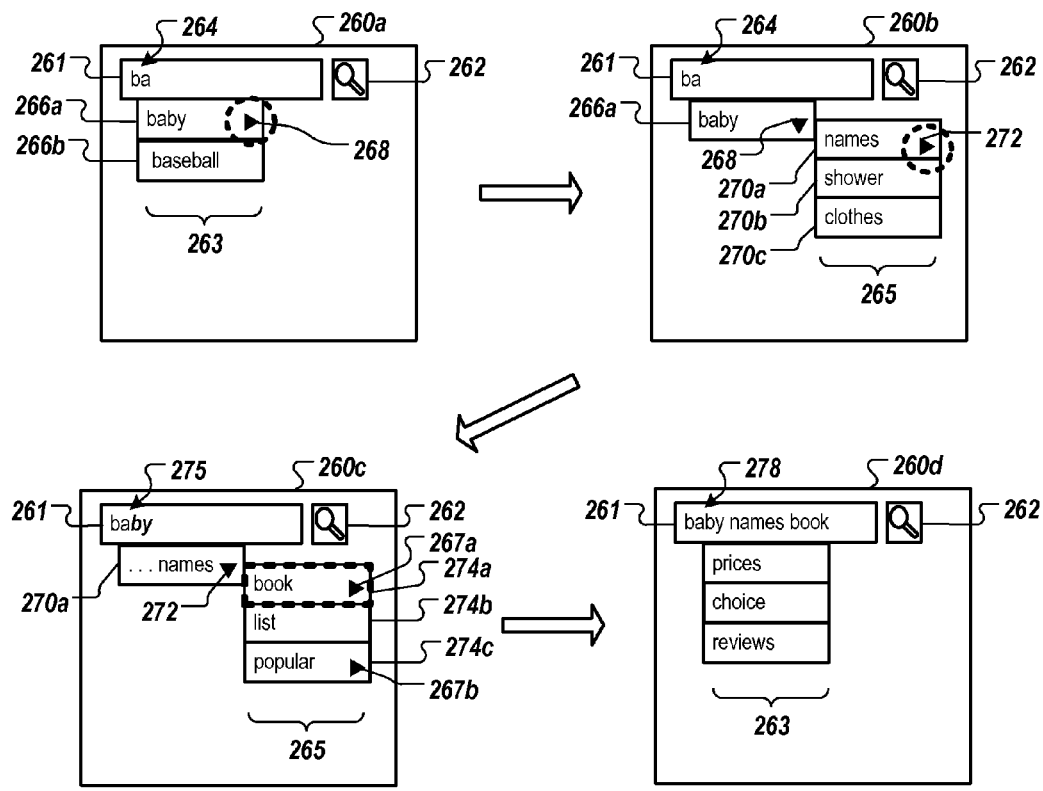

FIG. 2D illustrates examples of user interfaces 260a-260d that present autocomplete suggestions. The user interfaces 260a-260d are provided by a computing device (such as the computing device 104) and show a progression of updates that occur in response to user interactions. Through various interactions, a user can build a phrase and include the phrase in a query.

The user interface 260a includes an input field 261 and a search initiation control 262. In response to interaction with the search initiation control 262, the computing device can receive query completion data and initiate a search using a query 264 that has been entered in the input field 261. Autocomplete suggestions for the query 264 are displayed in separately selectable cells 266a, 266b, which are arranged in a column 263. In response to interaction with one of the cells 266a, 266b, the computing device can form an extended query that includes the corresponding autocomplete suggestion and configures the user interface 260a to receive additions to the extended query.

In some implementations, one or more of the selectable cells 266a, 266b can have an associated list control 268. The presence of the list control 268 can indicate that one or more related words are available to extend the query 264 beyond the text of the autocomplete suggestion displayed in the cell 266a. For example, the list control 268 can indicate that additional autocomplete suggestions are associated with (e.g., conceptually nested within) the cell 266a and can be accessed using the list control 268 (e.g., the list can be expanded). The list control 268 can be provided for one of the cells 266a, 266b when, for example, the computing device identifies or receives autocomplete suggestions that are related to the autocomplete suggestion corresponding to the cell 266a, 266b. Related autocomplete suggestions can be, for example, topically related to the autocomplete suggestion that is displayed in the corresponding cell 266a. As another example, related autocomplete suggestions can occur with at least a minimum frequency after the displayed autocomplete suggestion in a set of search queries or other text.

The user can interact with the list control 268, for example, by interacting with (e.g., tapping or clicking) a particular target area, for example, a region within one of the cells 266a, 266b. Alternatively, the user can interact with the list control 268 by performing a particular gesture, for example, tapping on the cell 266a and maintaining contact for a predetermined amount of time. User interaction with the list control 268 can be considered to be an interaction with the associated cell 266a.

The list control 268 can include an arrow, a caret, plus symbol, or another symbol. Interaction can change the appearance of the list control 268. For example, the list control 268 can alternate between two states to indicate whether subsequent interaction with the list control 268 displays or hides (e.g., expands or contracts) an associated list display. The computing device can present different symbols (e.g., a plus symbol and a minus symbol) for the different states, change the orientation of a symbol, or make other visual changes.

In the illustrated example, a user interacts with the list control 268, and the computing device presents the user interface 260b in response. The user interaction with the list control 268 can be considered an interaction with the cell 266a, signifying that the user at least tentatively intends to extend the query 264 by including the autocomplete suggestion displayed in the cell 266a associated with the list control 268. The cell 266a is displayed, indicating the autocomplete suggestion that the user has selected. In some implementations, cells that are not associated with the list control 268 (e.g., the cell 266b) are not presented on the user interface 260b. In the expanded state of the list control 268, additional autocomplete suggestions are displayed in a column 265 of selectable cells 270a-270c. The column 265 is located adjacent to the cell 266a, which may be displayed at the same location displayed in the user interface 260a or in a different location.

By interacting with one of the cells 270a-270c, the user can include both the autocomplete suggestion in a selected cell 270a-270c and the autocomplete suggestion of the cell 266a in an extended query. In the illustrated example, user interaction with the cell 270c can cause the query 264 to be replaced with an extended query, "baby clothes", which includes the autocomplete suggestions from selected cells 266a and 270c.

The cells 270a-270c can also have associated list controls, which the user can interact with to build a phrase using multiple autocomplete suggestions. In the illustrated example, the cell 270a has an associated list control 272. In response to interaction with the list control 272, the computing device presents autocomplete suggestions that continue an input sequence (e.g., a phrase or pattern) that includes the autocomplete suggestions of the cell 266a and the cell 270a (e.g., the phrase "baby names").

In the illustrated example, the user interacts with the list control 272, and the computing device presents the user interface 260c in response. Compared to the user interface 260b, the location of the cell 270a is shifted (for example, to the left). The cell 266a is not shown, but the corresponding autocomplete suggestion (e.g., "baby") remains part of the input sequence being composed. To indicate this to the user, the autocomplete suggestion that corresponds to the cell 266a (e.g., "baby") can be presented in the input field 261 as a tentative or intermediate query 275. Input that was previously entered or confirmed by the user (e.g., "ba" of the query 264) can be displayed with formatting that is different from input that is tentatively added using the autocomplete suggestions (e.g., the added suffix "by"). The different formatting can assist the user to distinguish previously accepted input from input being composed using the autocomplete suggestions.

In some implementations, an ellipsis or other symbol can be added to the cell 270a to indicate that other input (e.g., the "by" suffix) besides the contents shown in the cell 270a is part of the input sequence being composed. In some implementations, the computing device determines whether an amount of display space available for the display of the cell 270a is sufficient to include the autocomplete suggestion of the cell 266a (e.g., "baby"). If the space is determined to be sufficient, the entire input sequence (e.g., "baby names") can be presented in the cell 270a. If the space is determined to be insufficient, an ellipsis can be displayed and the autocomplete suggestion can be displayed in the input field 261 instead, as illustrated.

Additional autocomplete suggestions for the input sequence of cell 266a and cell 270a (e.g., the phrase "baby names") are presented in separately selectable cells 274a-274c. List controls 267a, 267b can be presented for one or more of the cells 274a-274c. Interaction with one of the list controls 267a, 267b can cause additional autocomplete suggestions to be displayed. For example, a user can interact with a selected one of the cells 274a-274c, and the selected cell can be displayed at the location of the cell 270a. Cells displaying further autocomplete suggestions may be displayed in the column 265.

Interaction with one of the cells 274a-274c that is not an interaction with a list control extends the user's input sequence to include the autocomplete suggestion displayed in the selected cell. For example, the interaction causes an input sequence including the contents of the cell 266a (e.g., "baby"), the cell 270a (e.g., "names"), and the selected cell to be included in an extended query. The interaction can finalize the input sequence, and the computing device can hide previously selected cells in response.

In the illustrated example, the user interacts with the cell 274a but does not interact with the list control 267a associated with the cell 274a. The computing device presents the user interface 260d in response. An extended query 278, "baby names book" is included in the input field 261, reflecting the input sequence composed using multiple autocomplete suggestions. In some implementations, interaction with one of the cells 266a, 266b, 270a-270c, 274a-274c does not cause query completion data to be received by the computing device. The user can thus add to the extended query 278 or can cause a search to be initiated through interaction with the search initiation control 262.

In some implementations, a user can interact with a cell to undo a selection of an autocomplete suggestion. After a first user interaction with a cell to select an autocomplete suggestion, a subsequent user interaction with that cell can reverse the selection. In the illustrated example, the user interface 260c is presented after a first interaction with the list control 272. In response to a second user interaction with the list control 272 (or another interaction with the cell 270a), the computing device can present the user interface 260b. The autocomplete suggestion displayed in the cell 270a (e.g., "names") is removed from the input sequence. When the user interface 260b is presented, if the user interacts with the list control 268 (or otherwise interacts with the cell 266a), the computing device can present the interface 260a and undo changes to the input sequence caused by the previous interaction with the list control 268.

Figure 2E:
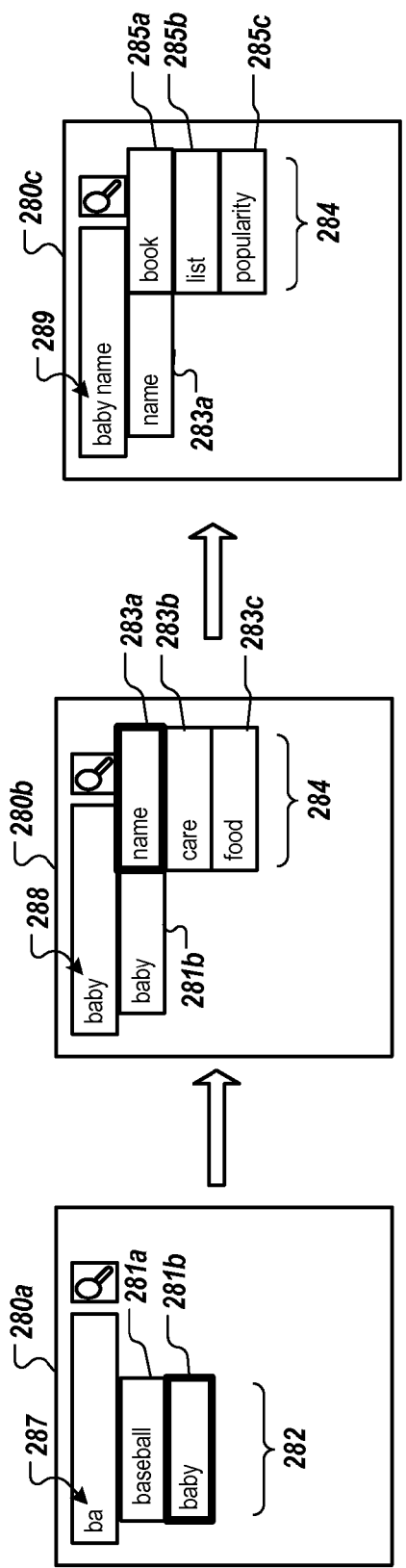

FIG. 2E illustrates examples of user interfaces 280a-280c that present autocomplete suggestions. The user interfaces 280a-280c are provided by a computing device (such as the computing device 104) and show a progression of updates that occur in response to user interactions. After a user interacts with a selected cell, an autocomplete suggestion associated with the cell (e.g., displayed in the cell) is included in the user's query to form an extended query. The selected cell remains displayed on the user interface, and can be displayed at a location different from the location of the selected cell when the user interacted with the selected cell. Autocomplete suggestions for the extended query are presented in a column adjacent to (e.g., to the side of) the selected cell. For subsequent interactions with additional cells, the cell that is most recently interacted with is displayed and cells identifying additional autocomplete suggestions are presented (e.g., presented in a column adjacent the cell most recently interacted with).

In some implementations, transitions between the user interfaces 280a-280c involve visible movement of cells, for example, transitions in which cells displaying autocomplete suggestions visibly shift or slide in a horizontal direction. For example, newly presented columns of autocomplete suggestions slide into view from the right side of the screen. When a user interacts with a cell to select the cell, the selected cell slides to the left to a different location. Other cells can slide off the left side of the screen or otherwise not be displayed.

In the illustrated example, a query 287 is shown, and first cells 281a, 281b are displayed. Each of the first cells 281a, 281b is separately selectable and displays a different autocomplete suggestion for the query 287. When the user interface 280a is presented to a user, the user interacts with the cell 281b, and the computing device presents the user interface 280b in response.

In the user interface 280b, the cell 281b is displayed at a location different from the location it was displayed in the user interface 280a. The autocomplete suggestion displayed in the cell 281b, "baby," is included in the query 287 to form an extended query 288. The extended query 288 may be displayed in an input field, or alternatively, may not be displayed. Autocomplete suggestions for the extended query 288 are presented in separately selectable second cells 283a-283c, which are arranged in a column 284 located adjacent to the cell 281b (e.g., to the side of the cell 281b). The second cells 283a-283c can be positioned to the right of the cell 281b for languages that are read from left to right. Alternatively, the second cells 283a-283c can be positioned to the left of the cell 281b for languages that are read from right to left.

When the user interacts with one of the second cells 283a-283c, the corresponding autocomplete suggestion displayed in that cell is included in the extended query 288 to form an extended query 289. The cell that was interacted with moves to the location of the cell 281b, for example, with an animated transition. The cell 281b can be removed, for example, swept off to the left with an animated transition or otherwise not displayed.

In the illustrated example, a user interacts with the cell 283a on the user interface 280b, and the computing device presents the user interface 280c in response. The cell 283a moves from a first location (e.g., its location on the user interface 280b) to a different, second location (e.g., its location on the user interface 280c). For example, the cell 283a can occupy the former location of the cell 281b, as shown in the user interface 280c. The cell 281b can be swept off the display, obscured, removed, hidden, or otherwise not displayed in the user interface 280c.

The user interface 280c also presents autocomplete suggestions for the extended query 289, displayed in separately selectable third cells 285a-285c. The third cells 285a-285c can be moved to the locations shown with an animated transition. For example, the cells 285a-285c can move to the column 284 from the right (e.g., moving from a location off screen to the locations illustrated). The cell 281b, the cell 283a, and the third cells 285a-285c can move together, for example, sliding as a group in a leftward motion.

As new cells are presented in the column 284, the user can interact with the new cells to include the corresponding autocomplete suggestions, further extending the extended query 289. Successive interactions with different cells cause a series of horizontal motions or transitions (e.g., each moving cells to the left) that present new autocomplete suggestions in the column 284 and also display a previously selected cell (e.g., a cell displaying the most recently selected autocomplete suggestion) in an adjacent cell. As described above, cells that are not selected can be swept off the screen (e.g., off the left side of the screen) or can otherwise not be displayed.

In some implementations, an autocomplete suggestion is added to the input field as part of a user's query in response to interaction with the corresponding cell. The autocomplete suggestion can be added while the selected cell is displayed (e.g., before a second cell is subsequently selected), as shown in FIG. 2E. For example, in the user interface 280c, the autocomplete suggestion "name" is displayed as part of the query 289 while the cell 283a is displayed. As an alternative, the autocomplete suggestion for a selected cell may not be added to the input field until a subsequent cell is selected, or until the corresponding cell is no longer visible (e.g., until the selected cell is swept off the left side of the screen). Thus when a selected cell is removed from display, the autocomplete suggestion for the selected cell can be added to the input field at the same time or in response to the selected cell being removed.

In some implementations, a user can interact with a previously selected cell to undo a prior selection, as described above with respect to FIG. 2D. For example, when the user interface 280c is presented, the user can interact with the cell 283a to remove the autocomplete suggestion (e.g., "name") associated with the cell 283a, undoing the effects of the prior interaction with the cell 283a and restoring the extended query 288. In response to the user interaction, the computing device can present the user interface 280b, for example, with a transition in which cells are moved to the right (e.g., in the opposite direction as during the transition from the user interface 280b to the user interface 280c). As another example, when the user interface 280b is presented, the user can interact with the previously selected cell 281b to undo the inclusion of the corresponding autocomplete suggestion (e.g., "baby"). The computing device can restore the original query 287 and present the user interface 280a in response. In general, cells can slide to the left when autocomplete suggestions are selected, making space to display additional cells with new autocomplete suggestions. Cells can move to the right when selections are undone, and cells previously removed or hidden from the user interface can be displayed again.

Each of the example user interfaces in FIGS. 2A to 2E can be used with the system of FIG. 1 to permit a user to build a query word by word or phrase by phrase. In addition, the features illustrated in and described with respect to FIGS. 2A to 2E can be combined with each other and with those of FIG. 1. For example, the user interfaces of FIG. 1 can optionally include one or more of, for example, repeating portions of a query in a cell (FIG. 2A), scrolling functionality (FIG. 2B), multiple target areas for each autocomplete suggestion (FIG. 2C), nesting and expansion of related autocomplete suggestions (FIG. 2D), and animated transitions that sweep autocomplete suggestions on and off a screen (FIG. 2E).

In some implementations, cells can be rectangular, circular, or oval, or can have other shapes. In some implementations, a cell is considered to be different from another cell when the cells are associated with different autocomplete suggestions. For example, when a cell has a target area associated with a first autocomplete suggestion, and the target area is later associated with a different autocomplete suggestion (e.g., a different autocomplete suggestion is displayed in the target area), the change can be considered to replace the initially displayed cell with a different, second cell, even if the location and boundaries of the target area do not change.

Figure 3:
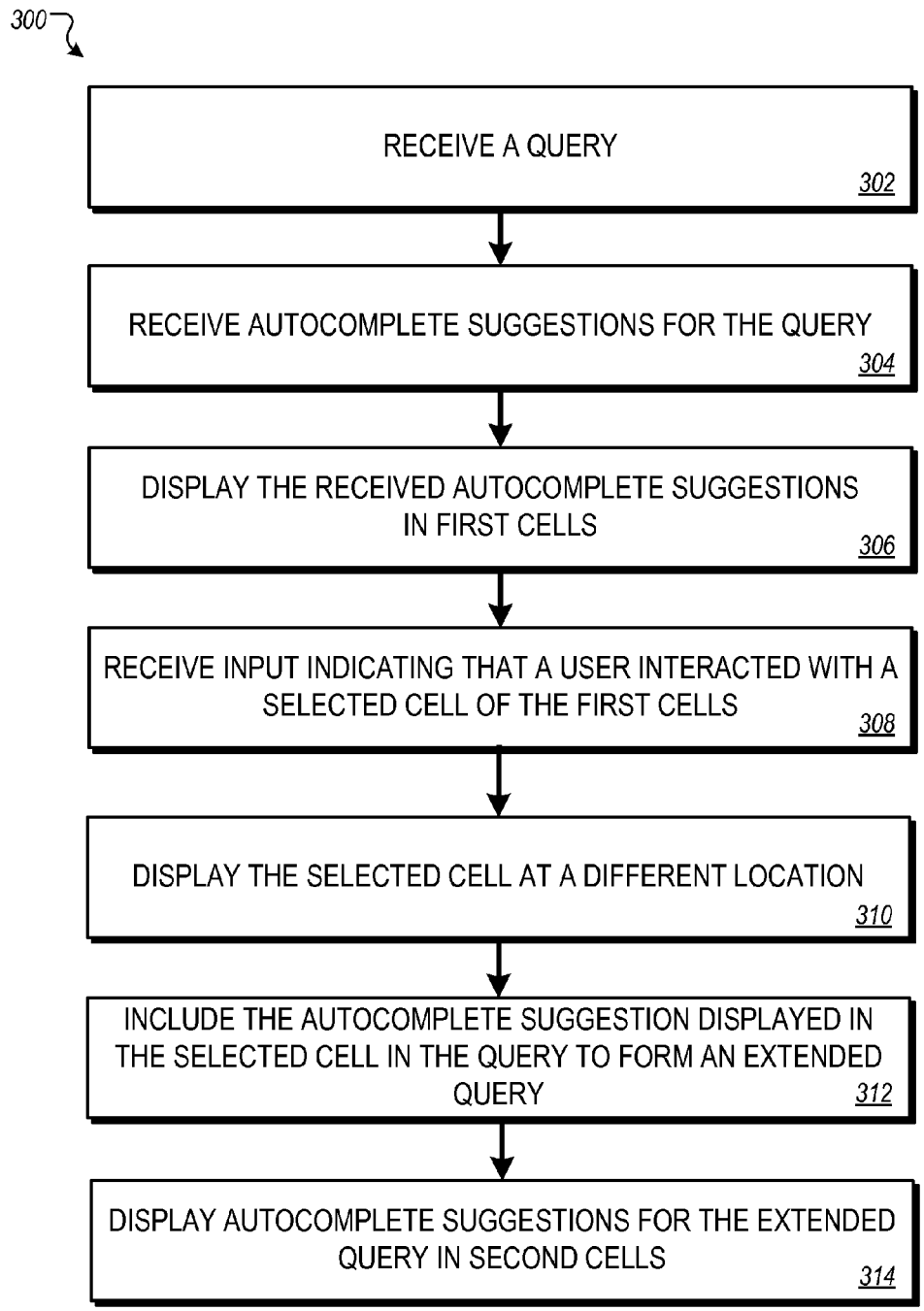
FIG. 3 is a flow diagram that illustrates an example of a process for presenting autocomplete suggestions.

FIG. 3 is a flow diagram that illustrates an example of a process 300 for presenting autocomplete suggestions. The process 300 may be performed by one or more computing devices, for example, those of the environment 100 of FIG. 1. The process 300 can include features as shown and described with FIGS. 1 and 2A to 2E.

A query including an n-gram of characters is received by a computing device (302). For example, with respect to FIG. 1, the query 114a can be received by the computing device 104. As additional examples, the query 264 of FIG. 2D or the query 287 of FIG. 2E can be received. The received query can be an extended query that includes one or more autocomplete suggestions.

Autocomplete suggestions for the query are received by the computing device (304). The autocomplete suggestions can be received from a server system, for example, in response to transmitting the query to the server system prior to receiving query completion data. For example, with respect to FIG. 1, the computing device 104 can receive autocomplete suggestions for the query 114a from the server system 106 in response to transmitting the query 114a in the request 118. One or more of the received autocomplete suggestions can be a proper subset of words in a prior query submitted by a user or a different user.

One or more of the received autocomplete suggestions can be multigrams (e.g., can contain two or more terms). In some implementations, at least some of the autocomplete suggestions can be generated by the computing device, without transmitting the query 114a to a server system. For example, autocomplete suggestions can be received from a data store that is accessible to the computing device.

At least some of the received autocomplete suggestions are displayed in a plurality of separately selectable first cells on a user interface (306). The first cells can be arranged in a column on the user interface. Fewer than all of the autocomplete suggestions that were received can be displayed. For example, only a proper subset of the received autocomplete suggestions may be displayed. For example, with respect to FIG. 2E, the received autocomplete suggestions for the query 287 can be displayed in first cells 281a, 281b, arranged in the column 282.

The received autocomplete suggestions can be displayed on a display of the computing device that received the query and/or on a display of another device. For example, autocomplete suggestions can be displayed on a computing device different from the computing device that received the query from a user (e.g., on a device that mirrors the display of the computing device).

In some implementations, the query is displayed on the user interface in a text field (or other input field) for receiving a query. The column of first cells can be displayed below and at a predetermined position relative to the text field.

In some implementations, a first target area and a second target area are displayed for each displayed autocomplete suggestion. Interaction with the first target area provides input indicating that the corresponding autocomplete suggestion has been selected, but does not provide query completion data indicating that the user has completed entry of the query, for example, as shown in FIG. 2C. Interaction with the second target area provides input that the corresponding autocomplete suggestion is selected, and also provides the query completion data.

Input is received that indicates that a user interacted with a selected cell of the displayed first cells (308). The interaction can occur while the selected cell is displayed at a first location on the user interface. The input can identify the displayed autocomplete suggestion that has been selected. For example, with respect to FIG. 2E, user interaction with the cell 281b, which is one of the first cells 281a, 281b, provides input that the autocomplete suggestion displayed in the cell 281b has been selected by the user 102. The input can indicate that the user interacted with a list control associated with the selected cell. For example, with respect to FIG. 2D, the input can indicate that the user interacted with the list control 268 or the list control 272.

The selected cell is displayed at a second location on the user interface (310). The second location is different from the first location. For example, the second location may be above, below, to the right, and/or to the left of the first location. For example, with respect to FIG. 2E, the cell 281b is displayed at a first location on the user interface 280a and is displayed at a different location on the user interface 280b after being selected by a user. As another example, with respect to FIG. 2D, the cell 270a is displayed at a first location on the user interface 260b, and after the user interacts with the list control 272 of the cell 270, the cell 270a is displayed at a different, second position on the user interface 260c. In some implementations, the selected cell at the second location may occupy some of the area occupied by the selected cell at the first location.

The autocomplete suggestion displayed in the selected cell is included in the query to generate an extended query (312). Including the autocomplete suggestion in the query can include replacing a portion of the query with the selected autocomplete suggestion. Including the autocomplete suggestion in the query can also, or alternatively, include appending the selected autocomplete suggestion to the query. For example, with respect to FIG. 2E, after the user interacts with the cell 281b, the autocomplete suggestion displayed in the cell 281b is included in the query 287 to generate the extended query 288.

Autocomplete suggestions for the extended query are displayed in separately selectable second cells (314). The second cells are arranged in a column on the user interface, and the column is located adjacent to the selected cell when the second cell is at the second location. For example, with respect to FIG. 2E, on the user interface 280b, the second cells 283a-283c are displayed in the column 284, and the column 284 is located adjacent the selected cell 281b. In some implementations, the column of the second cells is displayed where the column of the first cells was located when the user interacted with the selected cell. For example, with respect to FIG. 2D, after a user interacts with a cell in the column 265, a different set of cells can be displayed in the column 265. Similarly, with respect to FIG. 2E, different sets of cells can be displayed in the column 284.

In some implementations, the selected cell is displayed at the second location (310), the autocomplete suggestion is displayed in the selected cell is included the query (312), and the second cells are displayed (314) in response to receiving the input indicating that the user interacted with the selected cell (308). In some implementations, the first cells other than the selected cell are not displayed on the user interface in response to receiving the input. For example, the first cells that were not selected can be hidden, obscured, moved off of a displayed area, or otherwise not displayed.

In some implementations, the process 300 includes receiving second input indicating that the user interacted with a second selected cell of the second cells. In response to receiving the second input, the second selected cell can be displayed at the second location on the user interface, the autocomplete suggestion displayed in the selected cell can be included in the extended query to generate a second extended query, and autocomplete suggestions for the second extended query can be displayed in a plurality of separately selectable third cells. For example, with respect to FIG. 2E, in response to interaction with the second cell 283a on the user interface 280b, the user interface 280c is presented. In the user interface 280c, the cell 283a is presented in a different location, the second extended query 289 is generated, and third cells 285a-285c are displayed. The third cells can be arranged in a column on the user interface, and the column can be located adjacent to the second selected cell when the second selected cell is at the second location. The first selected cell can removed from (e.g., not displayed on) the user interface.

When the input indicates that the user interacted with a list control, autocomplete suggestions associated with the list control can be displayed in the second cells. A second input indicating a second interaction of the user with the list control can be received, and in response, the first cells can be displayed in a column on the user interface and the second cells can be not displayed on the user interface. The query can be restored by removing the autocomplete suggestion displayed in the selected cell from the extended query.

In response to receiving input from the user, the user interface can be configured to permit additions to the extended query prior to receipt of query completion data. As an example, configuring the user interface can include positioning a cursor (e.g., the text cursor 111 of FIG. 1) at the end of the extended query and not selecting (e.g., not applying text selection highlighting to) the extended query. If present, any selection of the extended query (e.g., highlighting of the extended query) may be removed so that adding additional autocomplete suggestions to the extended query will not overwrite the extended query. As another example, configuring the user interface can include preventing the extended query from being provided to a search engine system for search execution without first receiving query completion data indicating that the user has completed entry of the query.

In some implementations, the user interface can be configured to prevent submission of an extended search query to a search system prior to receiving the query completion data. Rather, the user 102 can further extend the extended query before a search is initiated. In some implementations, a search is not initiated until a user performs an action that causes query completion data to be received.

By contrast, in some implementations, an instant search feature can be enabled, and a search request can be sent to a search system in response to each change in the content of a user's query. In these implementations, the computing device can enable the user to continue to add additional autocomplete suggestions to the query until the query completion data is received, as described above.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A computer-implemented method, comprising:
  receiving, by a computing device, a query including an n-gram of characters;
  receiving, by the computing device, autocomplete suggestions for the query;
  displaying the received autocomplete suggestions in a plurality of separately selectable first cells, the first cells being arranged in a column on a user interface;
  receiving input indicating that a user interacted with a selected cell of the displayed first cells, the selected cell having a particular autocomplete suggestion displayed in the selected cell, the interaction occurring while the selected cell is displayed at a first location on the user interface; and
  in response to receiving the input indicating that the user interacted with the selected cell:
    removing, from the user interface, the first cells other than the selected cell,
    displaying the selected cell at a second location on the user interface instead of the first location on the user interface, the second location being different from the first location where the selected cell was located when the user interacted with the selected cell,
    including the particular autocomplete suggestion in the query to generate an extended query,
    displaying the extended query including the particular autocomplete suggestion from the selected cell while also displaying the particular autocomplete suggestion in the selected cell located at the second location on the user interface, and
    displaying autocomplete suggestions for the extended query in a plurality of separately selectable second cells, the second cells being arranged in a column on the user interface, the column of the second cells being located adjacent to the selected cell when the selected cell is at the second location.

2. The method of claim 1 wherein displaying the autocomplete suggestions for the extended query in the plurality of separately selectable second cells comprises displaying the column of the second cells where the column of the first cells was located when the user interacted with the selected cell.

3. The method of claim 1, wherein displaying the selected cell at a second location on the user interface comprises displaying the selected cell at a location to the left or to the right of the first location.

4. The method of claim 1, wherein:
  receiving the input indicating that the user interacted with the selected cell of the displayed first cells comprises receiving input indicating that a user interacted with a list control associated with the selected cell; and
  displaying autocomplete suggestions for the extended query in the plurality of separately selectable second cells comprises displaying autocomplete suggestions associated with the list control in the second cells.

5. The method of claim 4, further comprising:
  receiving input indicating a second interaction of the user with the list control; and
  in response to receiving the input indicating the second interaction of the user with the list control:
    not displaying the second cells on the user interface, and
    displaying the first cells in a column on the user interface.

6. The method of claim 1, wherein the selected cell is a first selected cell;
  wherein the method further comprises:
    receiving input indicating that the user interacted with a second selected cell that is one of the second cells; and
    in response to receiving the input indicating that the user interacted with the second selected cell:
      removing the first selected cell from the user interface,
      displaying the second selected cell at the second location on the user interface,
      including the autocomplete suggestion that is displayed in the second selected cell in the extended query to generate a second extended query, and
      displaying autocomplete suggestions for the second extended query in a plurality of separately selectable third cells, the third cells being arranged in a column on the user interface, the column of the third cells being located adjacent to the second selected cell when the second selected cell is at the second location.

7. The method of claim 6, further comprising, in response to receiving the input indicating that the user interacted with the first selected cell, displaying a movement of the first selected cell that slides the first selected cell from the first location to the second location;
  wherein removing the first selected cell from the user interface in response to receiving the input indicating that the user interacted with the second selected cell comprises displaying movement of the first selected cell that slides the first selected cell from the second location off of the user interface; and wherein the method further comprises, in response to receiving the input indicating that the user interacted with the second selected cell, displaying a movement of the second selected cell that slides the second selected cell from a location in the column of second cells to the second location.

8. The method of claim 1, further comprising transmitting the query to a server system prior to receipt of query completion data;

wherein receiving the autocomplete suggestions for the query comprises receiving the autocomplete suggestions for the query from the server system.

9. The method of claim 1, further comprising, in response to receiving the input indicating that the user interacted with the selected cell, displaying movement of the selected cell from the first location to the second location.

10. The method of claim 9, wherein displaying the autocomplete suggestions for the extended query in the plurality of separately selectable second cells comprises displaying the second cells in the area on the user interface where the first cells were displayed when the user interacted with the selected cell; and wherein displaying movement of the selected cell from the first location to the second location comprises displaying the selected cell sliding across the user interface from the first location on the user interface to the second location on the user interface, the second location being located to the left of the first location and being located adjacent the column of second cells.

11. A system, comprising:
one or more computers and one or more storage devices storing instructions that are operable, when executed by the one or more computers, to cause the one or more computers to perform operations comprising:
receiving a query including an n-gram of characters;
receiving autocomplete suggestions for the query;
displaying the received autocomplete suggestions in a plurality of separately selectable first cells, the first cells being arranged in a column on a user interface;
receiving input indicating that a user interacted with a selected cell of the displayed first cells, the selected cell having a particular autocomplete suggestion displayed in the selected cell, the interaction occurring while the selected cell is displayed at a first location on the user interface; and
in response to receiving the input indicating that the user interacted with the selected cell:
removing, from the user interface, the first cells other than the selected cell,
displaying the selected cell at a second location on the user interface instead of the first location on the user interface, the second location being different from the first location where the selected cell was located when the user interacted with the selected cell,
including the particular autocomplete suggestion in the query to generate an extended query,
displaying the extended query including the particular autocomplete suggestion from the selected cell while also displaying the particular autocomplete suggestion in the selected cell located at the second location on the user interface, and
displaying autocomplete suggestions for the extended query in a plurality of separately selectable second cells, the second cells being arranged in a column on the user interface, the column of the second cells being located adjacent to the selected cell when the selected cell is at the second location.

12. The system of claim 11 wherein displaying the autocomplete suggestions for the extended query in the plurality of separately selectable second cells comprises displaying the column of the second cells where the column of the first cells was located when the user interacted with the selected cell.

13. The system of claim 11, wherein displaying the selected cell at a second location on the user interface comprises displaying the selected cell at a location to the left or to the right of the first location.

14. The system of claim 11, wherein:
receiving the input indicating that the user interacted with the selected cell of the displayed first cells comprises receiving input indicating that a user interacted with a list control associated with the selected cell; and
displaying autocomplete suggestions for the extended query in the plurality of separately selectable second cells comprises displaying autocomplete suggestions associated with the list control in the second cells.

15. The system of claim 14, wherein the operations further comprise:
receiving input indicating a second interaction of the user with the list control; and
in response to receiving the input indicating the second interaction of the user with the list control:
not displaying the second cells on the user interface, and
displaying the first cells in a column on the user interface.

16. The system of claim 11, wherein the selected cell is a first selected cell; and
wherein the operations further comprise:
receiving input indicating that the user interacted with a second selected cell that is one of the second cells; and
in response to receiving the input indicating that the user interacted with the second selected cell:
removing the first selected cell from the user interface,
displaying the second selected cell at the second location on the user interface,
including the autocomplete suggestion that is displayed in the second selected cell in the extended query to generate a second extended query, and
displaying autocomplete suggestions for the second extended query in a plurality of separately selectable third cells, the third cells being arranged in a column on the user interface, the column of the third cells being located adjacent to the second selected cell when the second selected cell is at the second location.

17. The system of claim 16, wherein the operations further comprise, in response to receiving the input indicating that the user interacted with the first selected cell, displaying a movement of the first selected cell that slides the first selected cell from the first location to the second location;

wherein removing the first selected cell from the user interface in response to receiving the input indicating that the user interacted with the second selected cell comprises displaying movement of the first selected cell that slides the first selected cell from the second location off of the user interface; and wherein the method further comprises, in response to receiving the input indicating that the user interacted with the second selected cell, displaying a movement of the second selected cell that slides the second selected cell from a location in the column of second cells to the second location.

18. The system of claim 11, wherein the operations further comprise transmitting the query to a server system prior to receipt of query completion data;
wherein receiving the autocomplete suggestions for the query comprises receiving the autocomplete suggestions for the query from the server system.

19. The system of claim 11, wherein the operations further comprise, in response to receiving the input indicating that the user interacted with the selected cell, displaying movement of the selected cell from the first location to the second location.

20. The system of claim 19, wherein displaying the autocomplete suggestions for the extended query in the plurality of separately selectable second cells comprises displaying the second cells in the area on the user interface where the first cells were displayed when the user interacted with the selected cell; and
wherein displaying movement of the selected cell from the first location to the second location comprises displaying the selected cell sliding across the user interface from the first location on the user interface to the second location on the user interface, the second location being located to the left of the first location and being located adjacent the column of second cells.

21. A computer storage medium encoded with a computer program, the program comprising instructions that when executed by one or more computers cause the one or more computers to perform operations comprising:
receiving a query including an n-gram of characters;
receiving autocomplete suggestions for the query;
displaying the received autocomplete suggestions in a plurality of separately selectable first cells, the first cells being arranged in a column on a user interface;
receiving input indicating that a user interacted with a selected cell of the displayed first cells, the selected cell having a particular autocomplete suggestion displayed in the selected cell, the interaction occurring while the selected cell is displayed at a first location on the user interface; and
in response to receiving the input indicating that the user interacted with the selected cell:
removing, from the user interface, the first cells other than the selected cell,
displaying the selected cell at a second location on the user interface instead of the first location on the user interface, the second location being different from the first location where the selected cell was located when the user interacted with the selected cell,
including the particular autocomplete suggestion in the query to generate an extended query,
displaying the extended query including the particular autocomplete suggestion from the selected cell while also displaying the particular autocomplete suggestion in the selected cell located at the second location on the user interface, and
displaying autocomplete suggestions for the extended query in a plurality of separately selectable second cells, the second cells being arranged in a column on the user interface, the column of the second cells being located adjacent to the selected cell when the selected cell is at the second location.

22. The computer storage medium of claim 21 wherein displaying the autocomplete suggestions for the extended query in the plurality of separately selectable second cells comprises displaying the column of the second cells where the column of the first cells was located when the user interacted with the selected cell.

23. The computer storage medium of claim 21, wherein displaying the selected cell at a second location on the user interface comprises displaying the selected cell at a location to the left or to the right of the first location.

24. The computer storage medium of claim 21, wherein:
receiving the input indicating that the user interacted with the selected cell of the displayed first cells comprises receiving input indicating that a user interacted with a list control associated with the selected cell; and
displaying autocomplete suggestions for the extended query in the plurality of separately selectable second cells comprises displaying autocomplete suggestions associated with the list control in the second cells.

25. The computer storage medium of claim 24, wherein the operations further comprise:
receiving input indicating a second interaction of the user with the list control; and
in response to receiving the input indicating the second interaction of the user with the list control:
not displaying the second cells on the user interface, and
displaying the first cells in a column on the user interface.

26. The computer storage medium of claim 21, wherein the selected cell is a first selected cell; and
wherein the operations further comprise:
receiving input indicating that the user interacted with a second selected cell that is one of the second cells; and
in response to receiving the input indicating that the user interacted with the second selected cell:
removing the first selected cell from the user interface,
displaying the second selected cell at the second location on the user interface,
including the autocomplete suggestion that is displayed in the second selected cell in the extended query to generate a second extended query, and
displaying autocomplete suggestions for the second extended query in a plurality of separately selectable third cells, the third cells being arranged in a column on the user interface, the column of the third cells being located adjacent to the second selected cell when the second selected cell is at the second location.

27. The computer storage medium of claim 26, wherein the operations further comprise, in response to receiving the input indicating that the user interacted with the first selected cell, displaying a movement of the first selected cell that slides the first selected cell from the first location to the second location;
wherein removing the first selected cell from the user interface in response to receiving the input indicating that the user interacted with the second selected cell comprises displaying movement of the first selected cell that slides the first selected cell from the second location off of the user interface; and
wherein the method further comprises, in response to receiving the input indicating that the user interacted with the second selected cell, displaying a movement of the second selected cell that slides the second selected cell from a location in the column of second cells to the second location.

28. The computer storage medium of claim 21, wherein the operations further comprise transmitting the query to a server system prior to receipt of query completion data;

wherein receiving the autocomplete suggestions for the query comprises receiving the autocomplete suggestions for the query from the server system.

29. The computer storage medium of claim 21, wherein the operations further comprise, in response to receiving the input indicating that the user interacted with the selected cell, displaying movement of the selected cell from the first location to the second location.

30. The computer storage medium of claim 29, wherein displaying the autocomplete suggestions for the extended query in the plurality of separately selectable second cells comprises displaying the second cells in the area on the user interface where the first cells were displayed when the user interacted with the selected cell; and wherein displaying movement of the selected cell from the first location to the second location comprises displaying the selected cell sliding across the user interface from the first location on the user interface to the second location on the user interface, the second location being located to the left of the first location and being located adjacent the column of second cells.

\* \* \* \* \*